Oct. 30, 1934.  J. R. SMITH  1,978,653
CHILD'S BICYCLE
Filed July 31, 1933
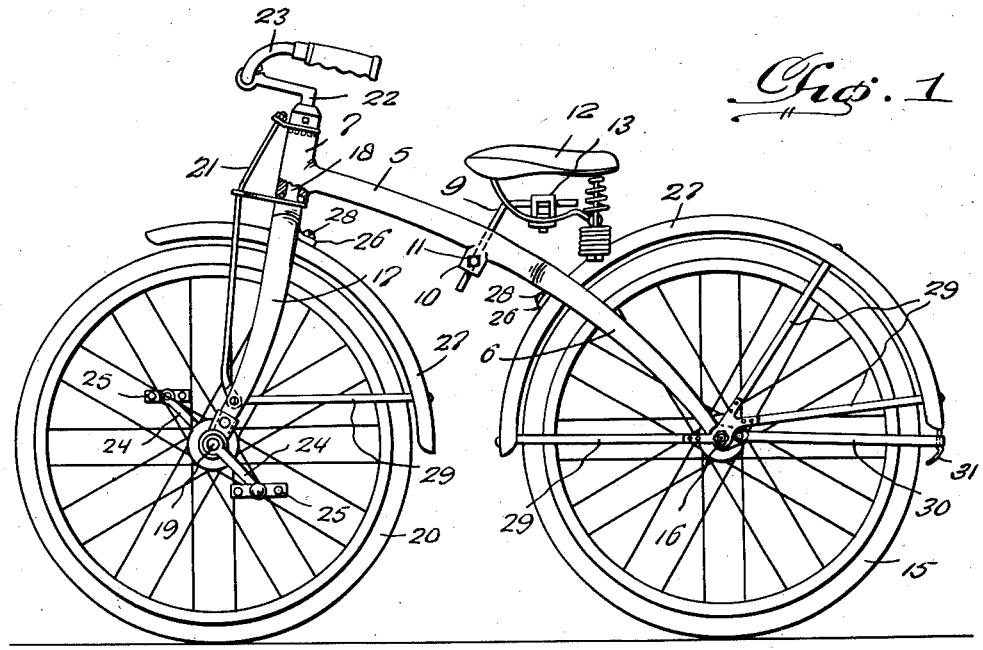
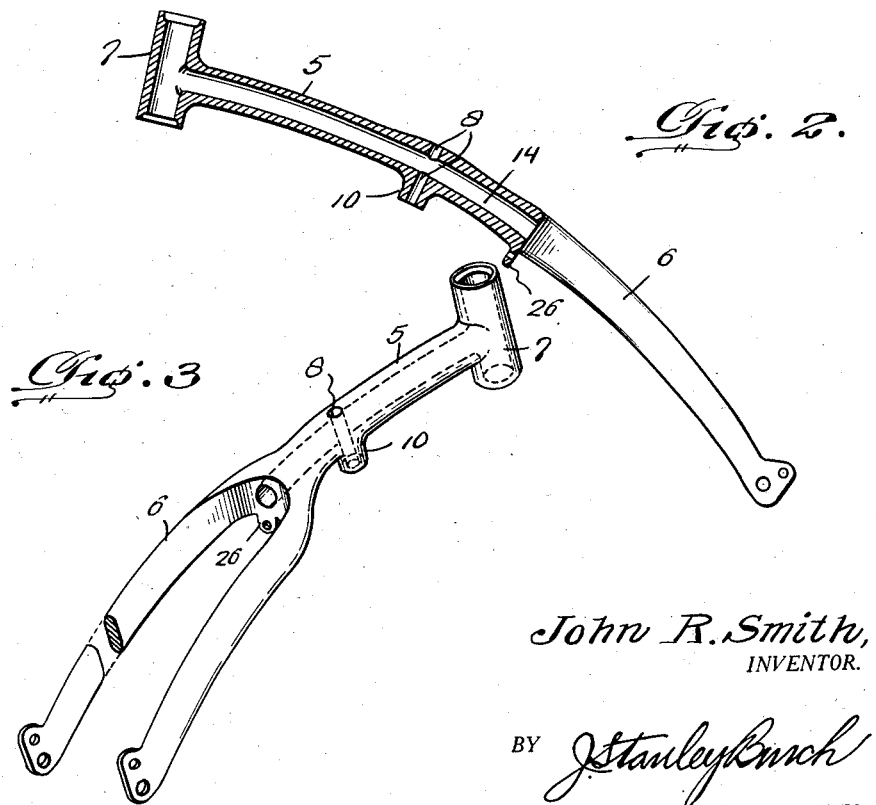
John R. Smith,
INVENTOR.
BY J. Stanley Burch
ATTORNEY.

Patented Oct. 30, 1934

1,978,653

UNITED STATES PATENT OFFICE 1,978,653

CHILD'S BICYCLE

John R. Smith, Massillon, Ohio

Application July 31, 1933, Serial No. 683,052

3 Claims. (Cl. 208—113)

This invention relates to an improved child's bicycle of the type disclosed in my United States Letters Patent No. 1,772,231, dated August 5, 1930.

Heretofore, in the construction of bicycles of the above type, it has been usual to construct the frame of sections joined together including a tubular upper longitudinal frame member, a front steering knuckle telescoped into or onto the front end of said longitudinal frame member, and a rear fork including a T-fitting telescoped onto or into the rear end of said longitudinal frame member and tubular fork legs joined to the ends of the branches of the T-fitting. In such prior constructions, the tubular frame members consisting of the longitudinal member and the legs of the fork have been constructed of relatively thin light tubing which required reinforcement to insure against bending or buckling thereof under the severe conditions of ordinary use. Moreover, the assembly of the frame parts or sections, besides being a skillful and time-consuming operation, necessitated the exercise of extreme care in order to insure proper relation of the rear fork and the front steering knuckle with respect to each other, so that perfect alinement of the wheels would be had when assembled to the frame.

The primary object of the present invention is to provide a frame construction for bicycles of the above kind which is simple and durable in construction, extremely economical to manufacture, possessing sufficient rigidity and strength without internal reinforcement, and having the rear fork and front steering knuckle in true relation so as to avoid the necessity of alinement of these parts after assembly. In addition, the present invention provides for manufacture of the frame members mentioned integrally joined in proper relation so that the tedious work of assembling the parts, heretofore involved, is eliminated.

I accomplish the above and other objects by casting the tubular upper longitudinal frame member, the front steering knuckle, and the rear fork integral with each other, the upper longitudinal frame member being axially cored out to reduce its weight, but to provide the same with a relatively thick wall possessing extreme rigidity and strength. By such a construction, the wall of the upper longitudinal frame member can be thickened and thereby reinforced at points where a greater strength is required, during manufacture. The entire frame unit may also be quickly produced in quantities with the parts already in proper assembled relation, and with no joints between the parts or sections likely to become loose or damaged. The absence of joints improves appearance as well as durability, and an integral boss is cast with the longitudinal frame member to receive the set screw by which the seat post is fastened in place, thereby eliminating the use of a separate seat post block on the upper longitudinal frame member.

Another feature of the present invention is to provide the cast metal forks of the bicycle frame with integral ears by means of which suitable mud guards may be conveniently fastened in place in a simple and durable manner, in conjunction with the usual bracing and supporting rods.

The present invention consists in the novel construction, form and arrangement of parts hereinafter more fully described, shown in the accompanying drawing and claimed.

In the drawing:

Figure 1 is a side elevational view of a child's bicycle embodying the present invention.

Figure 2 is a central longitudinal sectional view of the main frame unit; and

Figure 3 is a perspective view of the unit shown in Figure 2.

Referring in detail to the drawing, 5 indicates the upper longitudinal frame member of the bicycle having rigid with the rear end thereof, the rear fork 6, and having rigid with the front end thereof, the steering knuckle 7. The longitudinal frame member 5 is apertured as at 8 to receive the seat post 9, and integral with the under side of the longitudinal frame member 5 is a boss 10 having an opening in alinement with the apertures at 8 to also receive the seat post 9, the boss 10 having a tapped opening in one side thereof to receive the usual set screw 11 by which the seat post is held in vertically adjusted positions to regulate the height of the seat 12 which is connected by means of a suitable clamp 13 to the seat post 9. The integral depending hollow boss 10, in conjunction with the spaced apertures in the frame member 5, provide, in effect, a long bearing for the seat post 9 so as to effectively withstand lateral strain imposed upon the seat 12 under ordinary conditions of use. In practice, the members 5, 6, 7 and 10 are cast from suitable metal in integral form, the longitudinal frame member 5 being cored out as at 14 so as to be of tubular form and to reduce its weight. However, the bore of the frame member 5 is of such size as to give said frame member a relatively heavy and thick wall construction, so that the said frame member will be comparatively strong and rigid to effectively withstand bending strains and thereby resist bending or buckling. In fact, the wall of the member 5 is thickened at the point of juncture of the same at its ends with the fork member 6 and steering knuckle 7, as well as at the point where the same is provided with the apertures 8 for reception of the seat post 9, thus reinforcing the same at points where most of the strain is received.

In the rear fork 6 is journaled the rear wheel 15, in any suitable manner upon an axle 16.

The bicycle also includes a cast metal front fork 17 having an integral steering column 18 journaled in the steering knuckle 7. The legs of the fork 6 and 17 are of solid construction as clearly illustrated in Figure 3 with respect to the fork 6, and journaled in the front fork upon the axle 19 is the front wheel 20. The steering knuckle 7 and front fork 17 are preferably braced as at 21 in any well known or preferred manner, and the steering column 18 carries the usual post 22, which in turn carries the handle bar 23, of any suitable construction.

In order that the front axle and wheel may be directly driven, the ends of said axle project at opposite sides of the fork 17 and have crank arms 24 fixed thereon, which in turn carry pedals 25.

Cast integral with each of the fork members 6 and 17, at the crotch thereof, is a laterally projecting ear 26 to which the adjacent wheel fender 27 may be directly bolted as at 28, so as to be effectively rigidly mounted in place over the adjacent wheel, in conjunction with the usual fender supporting braces 29. A U-shaped stand 30 may be pivotally mounted upon the bicycle frame adjacent the ends of the rear axle 16, for the purpose of providing a support for the bicycle when not in use, a latch 31 being attached to the rear end of the rear mud guard 27 to engage and hold the stand in raised inoperative position.

From the foregoing description, it will be seen that I have provided a frame unit for bicycles of the type described which might be economically and expeditiously manufactured in one piece with the parts in true relation and of such character as to effectively resist bending or breaking. The point where the longitudinal frame member is apertured for reception of the seat post may also be integrally reinforced by increasing its heft when manufactured, so that the weight of the occupant of seat 12 may be safely imposed on the frame member 5. Similar reinforcements may be similarly provided at the point of juncture between the frame member 5 with the rear fork 6 and steering knuckle 7. No time-consuming and accurate assembly of these parts is involved, and although the weight of the frame unit may be reduced to a minimum by coring at 14, said frame member 5 may be made with a wall construction of suitable thickness to insure against bending or breaking even though the frame member 5 is devoid of internal reinforcement. Thus, a very simple and cheap frame may be practically employed having no separate or internal reinforcement, and in conjunction with which no separate additional lower longitudinal frame member need be employed.

Minor changes may be made without departing from the spirit and scope of the invention as claimed.

What I claim as new is:

1. In a child's bicycle, a frame unit cast in one piece and comprising an upper tubular longitudinal member terminating in an integral downwardly inclined rear fork having prongs of solid construction, and an integral tubular front steering knuckle; a front fork having a steering column journaled in the front steering knuckle, front and rear wheels mounted in the respective forks, said tubular longitudinal member being formed with vertically arranged seat post receiving openings and with an integral hollow boss on the under side thereof in alinement with said openings, and means carried by said boss and arranged to engage the seat post for holding the same in a desired vertically adjusted position.

2. In a child's bicycle, a main frame unit cast in one piece and including an upper tubular longitudinal member, a tubular front steering knuckle and a rear downwardly inclined fork integral with each other, the wall of said unit being thickened at the points of juncture of the tubular longitudinal frame member with the tubular front steering knuckle and with the rear fork, said longitudinal frame member having apertures for reception of a seat post and being thickened in the region of said apertures to reinforce the same, a front fork having a steering column journaled in the front steering knuckle, front and rear whels mounted in the respective forks, and means carried by said frame unit for holding the seat post in vertically adjusted positions.

3. In a child's bicycle, a frame including a main frame unit cast in one piece and composed of a tubular front steering knuckle, an upper tubular longitudinal member, and a downwardly inclined rear fork, the fork and steering knuckle being integrally joined to the ends of said tubular longitudinal member and the wall of the unit being thickened at said points of joining, said longitudinal member having vertical seat post receiving openings and having the wall thereof thickened in the region of said openings.

JOHN R. SMITH.